May 22, 1934.     C. S. WEYANDT     1,959,513
ELECTRICAL SUPPLY SYSTEM
Filed June 4, 1929     5 Sheets-Sheet 1

Inventor
Carl S. Weyandt
By Cornelius D. Ehret
his Attorney

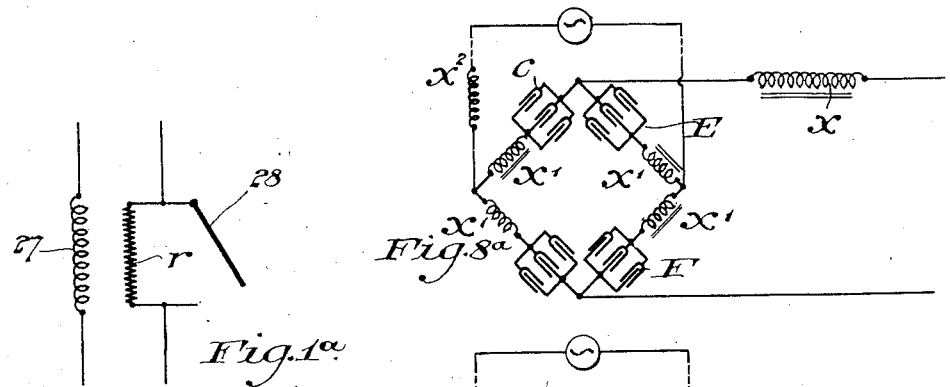
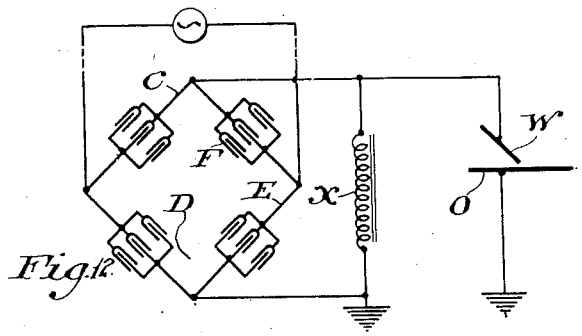
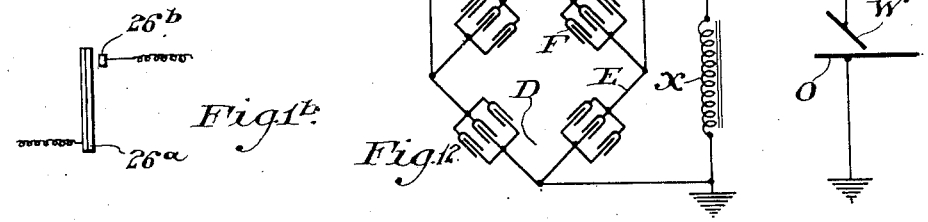
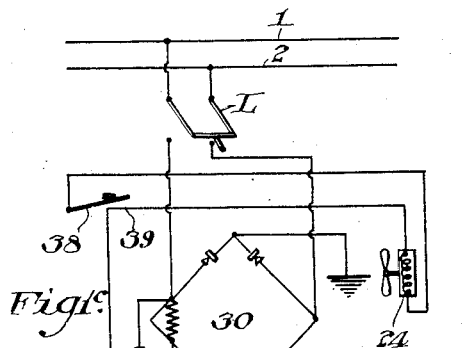
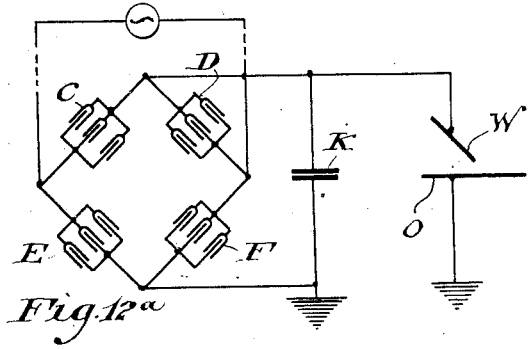
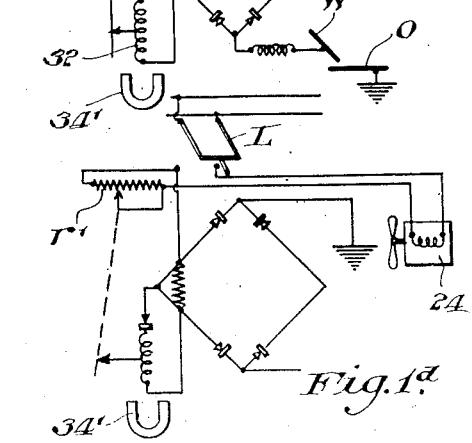
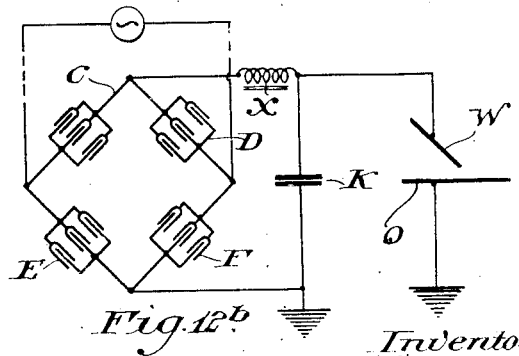

May 22, 1934.  C. S. WEYANDT  1,959,513
ELECTRICAL SUPPLY SYSTEM
Filed June 4, 1929   5 Sheets-Sheet 3

Inventor
Carl S. Weyandt
By Cornelius D. Ehret
his Attorney

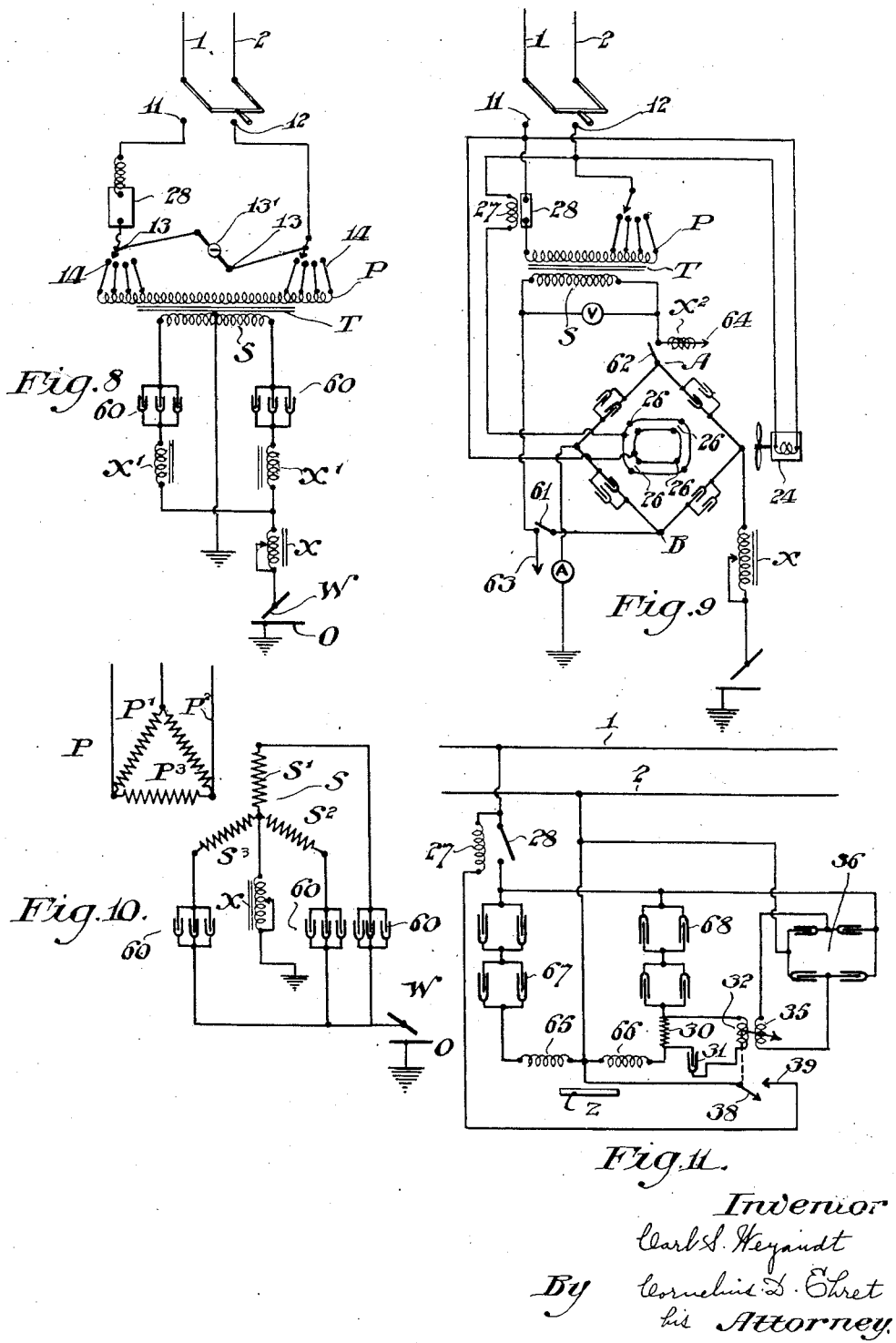

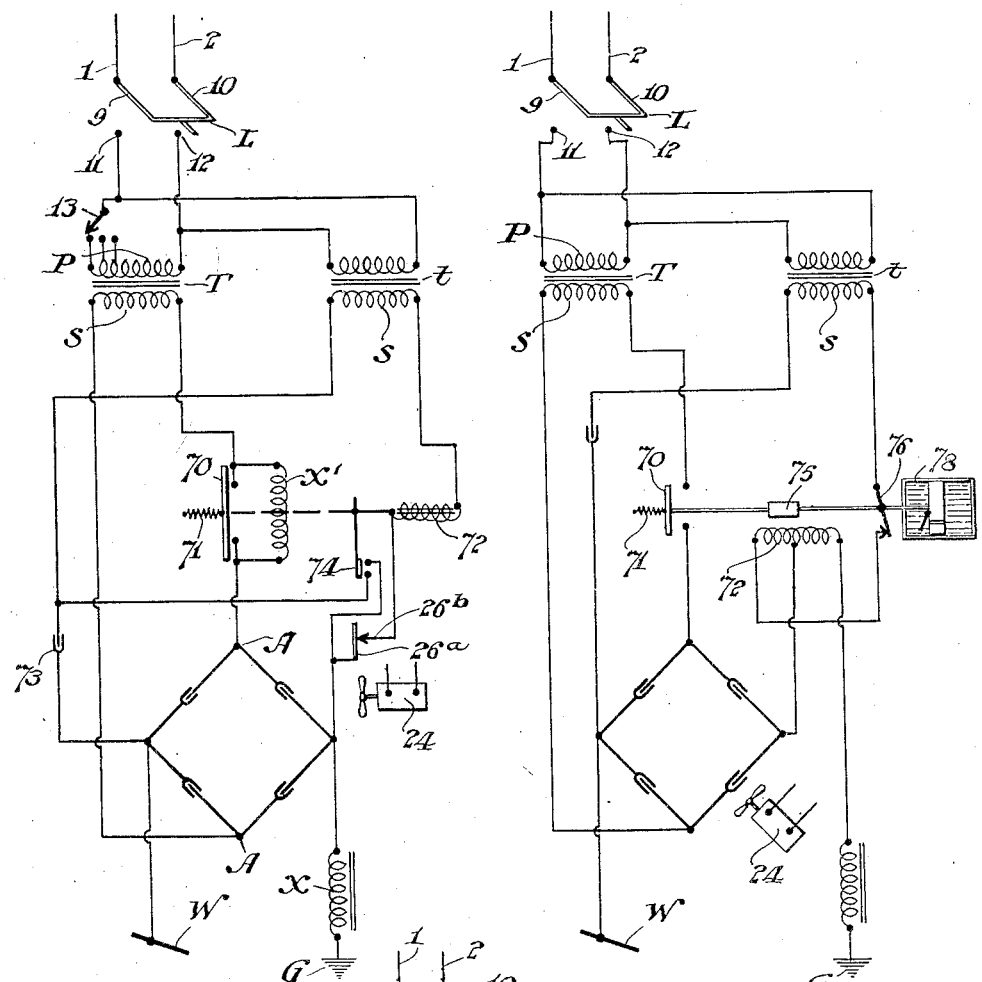
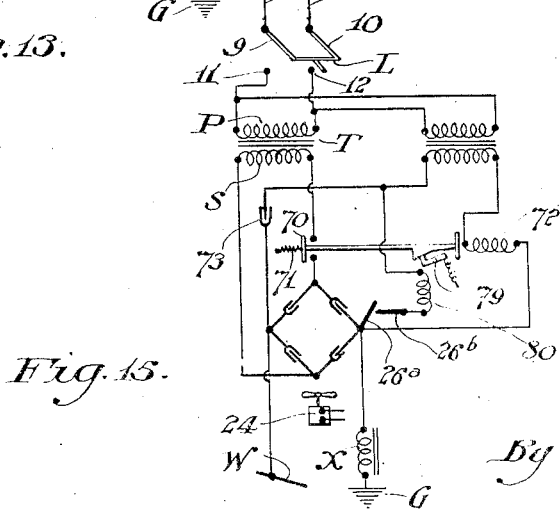
Fig.13.    Fig.14.    Fig.15.

Patented May 22, 1934

1,959,513

UNITED STATES PATENT OFFICE 1,959,513

ELECTRICAL SUPPLY SYSTEM

Carl S. Weyandt, Pittsburgh, Pa.

Application June 4, 1929, Serial No. 368,370

32 Claims. (Cl. 219—8)

My invention relates to electrical systems and circuits, particularly for arc-welding, utilizing preponderatingly uni-directional current, derived, for example, from a source of alternating current through electric valves, particularly of a type permitting substantial flow of inverse current, and especially of the cuprous oxide-copper type.

In accordance with one aspect of my invention, the current supplied to or through the rectifier is controlled, reduced or interrupted in direct or indirect response to predetermined magnitude of inverse current.

Further in accordance with my invention, in a system utilizing rectifiers of the type aforesaid, in a network, for example, a Wheatstone bridge, permitting flow of current through it in both directions between alternating current supply conductors and independently of the direct current or output circuit of the rectifier, there are provided means, as a switch, for controlling the flow of alternating current to the network or bridge, at or adjacent the point or region of utilization of the direct or rectified alternating current.

In accordance with another aspect of my invention, the speed and quality of welding by an electric arc is substantially improved by the use of pulsating or undulating current, as supplied for example and preferably by rectifiers of the above described type from an alternating current source. The ratio or relation between the maximum and minimum magnitudes, or crest and trough of the current waves delivered to the arc, is controlled by determination of the magnitude of an inductance included in the arc or rectifier-output circuit. This inductance, whether or not in association with additional inductance in the rectifier network, effectively reduces the potential producing or otherwise controls the magnitude of inverse current through the rectifiers, and makes possible the use of a substantially smaller number of rectifier elements in series.

Further in accordance with my invention, air, or other suitable medium, is forcibly circulated as by one or more exhaust fans into contact with the rectifier elements, to prevent flow of excess inverse current incident to high rectifier temperatures, and with the aforesaid inductive reactor in the arc circuit, the transformer interposed in circuit between an alternating current supply and the rectifier system, and other circuit elements.

For efficient operation, and for convenience in replacement, the rectifier elements are disposed in groups each removable as a unit from a supporting frame provided with guiding strips or rails suitably spacing the rectifier elements to expose large area of radiating surface to the cooling fluid.

Further in accordance with my invention, rectifier elements of the copper-copper oxide type are connected, as in parallel, by welding with an arc, the terminals of the elements to conductors, which preferably are rigid to support a rectifier unit comprised of a suitable number of elements.

My invention resides in the methods, systems, apparatus and features of construction and arrangement hereinafter described and claimed.

For an understanding of my invention, and for an illustration of some of the various forms it may take, reference is to be had to the accompanying drawings, in which:

Fig. 1 discloses a complete, pulsating direct-current arc-welding system.

Figs. 8, 8a, 9 and 10 are schematic wiring diagrams of modified forms of arc-welding systems.

Fig. 11 discloses an arrangement for supplying current to an electric reciprocating hammer and utilizing my invention.

Figs. 12, 12a and 12b illustrate further circuit modifications.

Figs. 13, 14 and 15 illustrate still further modifications having additional features of safety and convenience.

Figure 1:
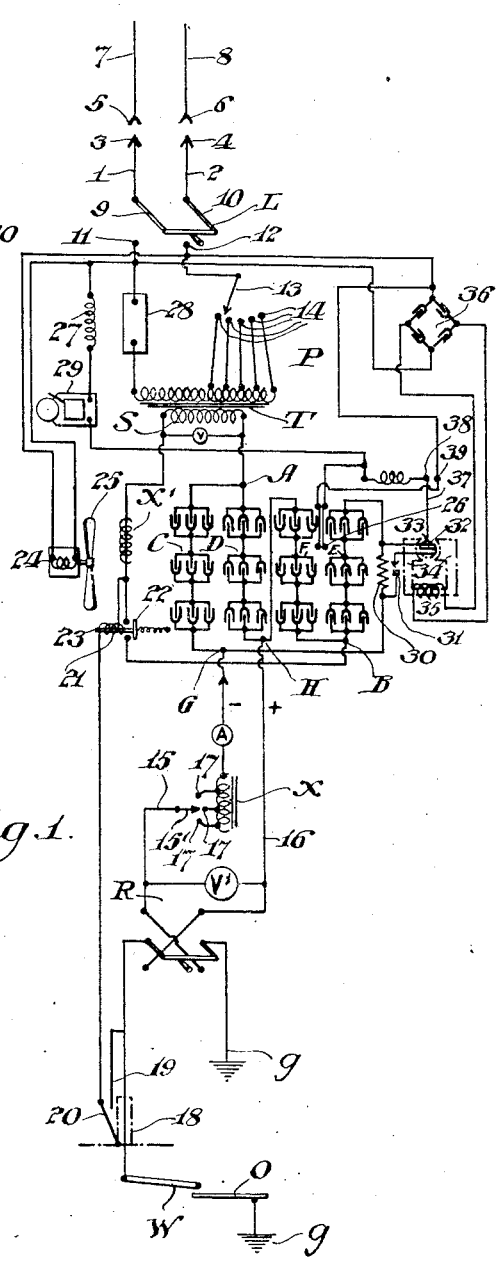
Figs. 1a and 1b illustrate diagrammatically modified forms of circuit-controller adapted for use in the system of Fig. 1.
Figs. 1c and 1d are of systems similar to that of Fig. 1 utilizing modified rectifier-cooling control arrangements.
Figure 6:
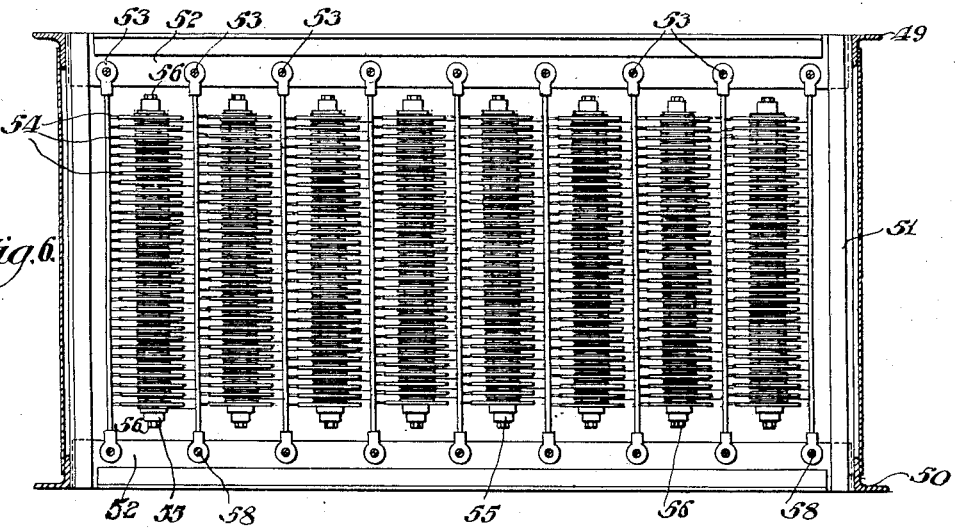
Figs. 5, 6 and 7 are respectively top plan, side elevational and end elevational views, with parts in section, of the rectifier assembly of Figs. 2 and 3.
Figure 5:
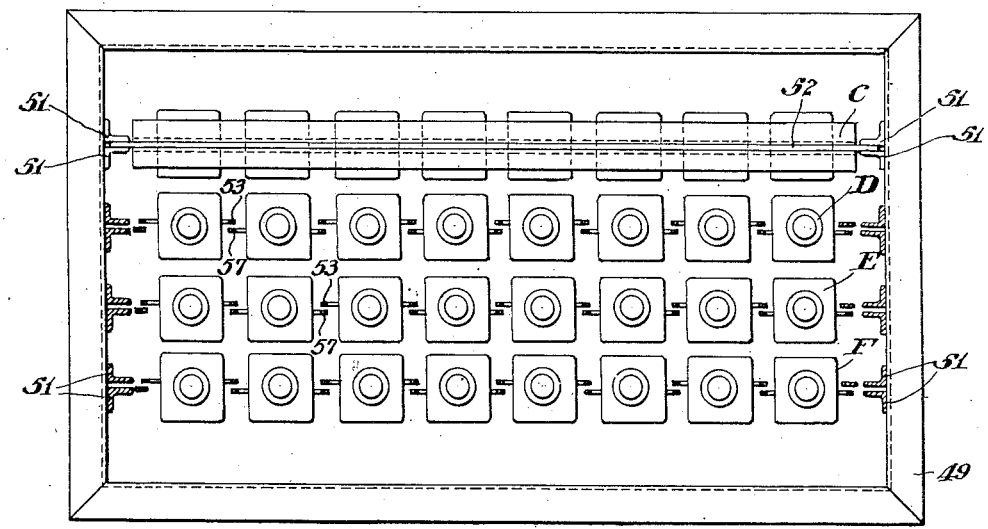
Figure 7:
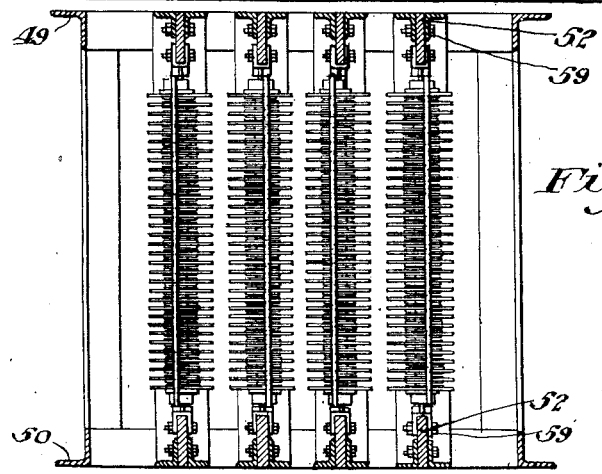

Referring to Fig. 1, conductors 1 and 2 terminate in a plug having contacts 3 and 4 adapted to engage co-operating contacts 5 and 6 of a receptacle or the like connected to the supply conductors 7 and 8, as of an ordinary commercial alternating current line or system, and are connected to the movable contacts or blades 9 and 10 of a switch L which when moved to the closed position, that is, into engagement with co-operating fixed contacts 11 and 12, effects flow of current through the primary P of a transformer T of suitably high capacity, and usually having a step-down ratio of voltage transformation, which is variable by adjustment of the movable contact arm 13 adapted selectively to engage contacts 14 to include more or less turns of the primary P in circuit.

The terminals of the secondary S of the transformer are connected to points A and B between which are connected the arms C, D, E and F of a Wheatstone bridge, the conjugate points G and H of which are connected by conductors 15 and 16 to a reversing switch R. Each arm of the bridge is composed of a suitable number of rectifier elements in series as determined primarily by the maximum voltage of secondary S and the inductance in circuit as hereinafter discussed, and a suitable number in parallel according to the active area of the rectifying elements and of the anticipated total load.

When the rectifying system is utilized for arc welding, the movable blades of the reversing switch R are connected to ground G and to a welding electrode W. The object O being welded, is connected to ground G. On the electrode holder 18 is mounted a switch having a fixed contact 19, connected to movable blade of the reversing switch R, and a movable contact 20 adapted to be held by an operator into engagement with fixed contact 19 against the biasing force as a spring, not shown, during manipulation of the electrode W, is connected through the winding 21 of a closing magnet to one terminal of the secondary S. A bridging contact 22 actuated by the core 23 of the closing coil 21 completes the circuit of the secondary S of the transformer T through the rectifier bridge. As the rectifier elements are of a type permitting a substantial flow of inverse current, even when there is no flow of current between the electrodes W, and O there is nevertheless a flow of current, and in both directions, in the circuit of the secondary S through opposite arms of the rectifier bridge. When for example the point A is positive and forward current flows through the arm D, there is flow of inverse current through arm E to the point B. Breaking of the alternating current supply circuit to the bridge, not only effects economy of operation, but also results in longer life of the rectifier elements. The provision of the control switch 19, 20 also prevents accidental and possibly prolonged short circuit occasioned for example by an operator leaving the electrode W in engagement with the electrode O. Additionally, when the arc or other load circuit is not complete, the potential across the input terminals of the rectifier is much higher and if the impedance of the rectifier input circuit is not increased, as by opening of switch 22, the inverse current may become dangerously high and of a magnitude destroying the effectiveness of the rectifier.

Closing of the line or supply switch L completes a circuit to a cooling fan 24 or equivalent, having an impeller 25 forcibly circulating air into and out of contact with the rectifier elements to maintain suitably low operating temperatures thereof.

The maximum safe operating temperature of solid rectifiers now used is about 150 degrees F. Operating in temperatures in excess of this, the thermostatic device 26 completes a circuit to the tripping coil 27 of a circuit breaker 28 to interrupt flow of current through the primary P of the transformer T or to insert a resistance $r$ (Fig. 1a) of magnitude suitably to reduce the current. If desired, a signal or indicating device 29, may be included in this circuit for visual or aural indication of the excessive temperature of the rectifier. The thermostatic device may be of any suitable known type or construction, for example, as shown in Fig. 1b, it may comprise a bi-metallic strip 26a which is warped or deformed by temperature rise to engage a fixed contact 26b completing an electrical circuit.

I prefer, however, to utilize the inverse current itself to produce the indication or control, rather than the temperature effects. In the connection between the arms C and E, for example, there is included a resistance 30 across which is connected a single rectifier element 31 in series with the winding 32 of a member 33 movable between the pole pieces 34 of an electro-magnet whose winding 35 is supplied with direct current from a rectifier bridge 36 whose input terminals are connected to contacts 11 and 12 of the supply switch L. Obviously the pole pieces 34 may be of a permanent magnet 34' (Figs. 1c and 1d) in which event the winding 35 and its energizing circuit may be dispensed with. The rectifier 31 is so poled, and the magnitude of resistance 30 is such that when the inverse current through either of arms D or F is in excess of the predetermined magnitude, the movable member 33 is deflected to an extent bringing a contact 38 carried by arm 37 connected to member 33 into engagement with a fixed contact 39 completing the circuit through tripping coil 27 of the breaker 28 to interrupt the current through the primary P as aforesaid. If desired, or necessary under the circumstances, one or more of the remaining connections between the rectifier arms may include resistances similar to resistance 30, and co-operating in a similar manner with a rectifier controlling energization of the trip 27. As the heat storage capacity of the rectifier elements is small, and particularly when cooling fans are used, the circuit breaker 28 may be reset within a short interval after tripping.

In the modification shown in Fig. 1c, the contacts 38 and 39 actuated by movement of the movable coil 32 in response to inverse current through the rectifier, are included in the circuit of the motor of the cooling fan 24 to effect its operation when the inverse current attains a predetermined high magnitude and vice versa. As in Fig. 1, a thermostat may be used instead of the described arrangement including resistance 30, rectifier 31, etc.

In the modification shown in Fig. 1d, the windings of the fan 24 are continuously energized when the switch L is in closed circuit position. The speed of the fan and therefore the cooling effect is determined by the effective magnitude of resistance $r1$ included in circuit therewith and variable in accordance with the position of movable coil 32 to which it is suitably mechanically connected or otherwise operably associated.

Other arrangements utilizing inverse current will be apparent or readily suggest themselves from the foregoing.

The relative polarity of the electrode holder W and of the object O can be controlled by throwing reversing switch R depending upon the nature and character of the work.

Heretofore it has been common to use direct current of substantially constant magnitude for electric welding as supplied for example by a generator, or storage battery. In practice it has been found that for a given R. M. S. value of undulating direct current supplied by a rectifier from an alternating current source, for example, as compared to the equivalent magnitude of direct current, the undulating direct current arc permits of greater speed of welding, and additionally, deeper penetration of the arc which is very desirable. It would appear that the undulating wave by virtue of its property of acceleration desirably changes the nature of the arc. The relation between the crest and trough of the current wave, or the ratio between the maximum and minimum values is determined by adjustment of the inductive reactor X, included, for example, in conductor 15. The amplitude of the undulation is preferably as great as possible without the minimums being too low for satisfactory operation of the arc. The amount of effective inductance may be suitably varied, as by a contact arm 15' adapted to selectively engage contacts 17 of the tapped winding or inductance X. The magnitude of arc ripple, or variations in current, produced by change in resistance of the arc, inherent in its operation, is reduced by the smoothing or inductive lag action of the reactor X whose magnitude may be, for example, from 2 millihenrys to 8 millihenrys, 5 millihenrys being suitable for general operation. Other factors remaining the same, for a given inductance the arc ripple is suppressed to greater extent when the current is undulating than when it is of substantially constant magnitude, as supplied, for example, by a generator. It will be understood that the actual values may vary from these figures depending upon other circuit constants. When the rectifier elements comprising the arms C, D, E and F are of the preferred, or cuprous oxide type, the effective back voltage producing flow of inverse current through the rectifier is opposed and reduced by a counter electro-motive force due to the inductance of the reactor X which permits of a smaller number of rectifier elements in series.

Figure 2:
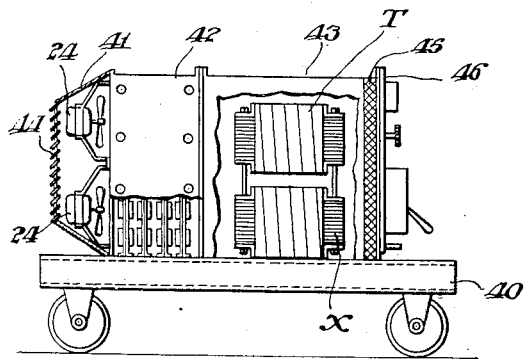
Figs. 2, 3 and 4 are respectively side elevational, plan, and front elevational views of portable arc-welding equipment comprised of apparatus diagrammatically shown in the system of Fig. 1.
Figure 3:
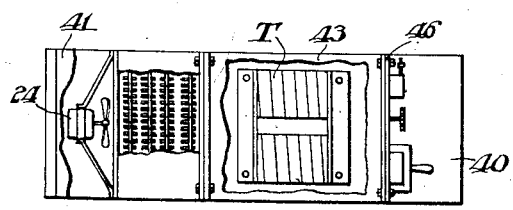
Figure 4:
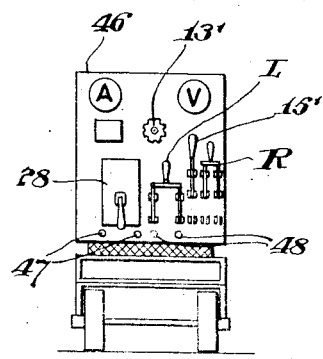

In Figs. 2, 3 and 4 there is shown a compact arrangement of the apparatus previously described, which may be for purposes of portability mounted upon a truck 40. The housing for the apparatus preferably consists of three chambers 41, 42 and 43, the first of which is provided with an open expanded metal front 44 to permit exhaust of air drawn by fans 24 through the second chamber 42 in which the rectifier elements are disposed. The fan system insures even distribution of a large volume of air at low pressure. Satisfactory cooling is effected when there are 300 cubic feet of air permitted per square foot of rectifier disc area. This magnitude is satisfactory when the rectifier depth is about one foot; for greater or lesser depth, the volume of air should be changed accordingly. As the magnitude of the inverse current depends upon the resistance of the rectifier, which decreases with increase of temperature, cooling of the rectifiers by forced circulation is of distinct advantage when a current demand or load upon the rectifiers is high. The air before passing through chamber 42 enters the closed housing of chamber 43, through grill work or mesh 45 in which is disposed the transformer T and the reactor X, whose operating temperatures are permissibly higher than that of the rectifier. By disposing the transformer and reactor in the path of the cooling air it has been possible in practice to reduce them in size approximately 25% to 35%.

The transformer T may be constructed to deliver for example, approximately 275 to 300 R. M. S. amperes at arc potentials of from between 15 to 22 volts, although it may be higher depending upon the nature of the work, experience of the welder, etc. The ammeter A in the conductor 15, and the voltmeter V in shunt to the secondary S of the transformer are mounted upon a panel 46 to indicate to an operator the voltage impressed upon the bridge, and the current drawn by the arc. Voltmeter V1 connected between conductors 15, 16 indicates the arc potential. On the same panel and accessible to the operator may be mounted the operating handle of the switch 13 for varying the number of turns included in the circuit of the primary P, the breaker 28, the line switch L, the reversing switch R, the switch 15' controlling inductance of reactor X, binding posts 47, or equivalent, for receiving conductors connected respectively to ground and to the electrode W, and binding posts 48 for receiving supply conductors 1 and 2.

The temperature responsive protective device or devices 26 if used, is or are disposed in the end of housing 42 more or less adjacent fans 24, that is in the portion of the rectifier at which the temperature is or may be highest.

Between the upper and lower frame members 49 and 50 respectively at opposite sides of the housing 42, extend the pairs of guide rails 51, 51. Between opposite, and corresponding pairs of guide rails 51 extends a pair of spaced fibre strips 52, 52 between which extend the parallel buses 53 secured to, for example, the positive plates 54 of rectifier elements assembled on rod 55 and clamped in position by nuts 56. To the other sides of the strips 52, 52 are attached buses 57 connected to the negative plates of the rectifier elements, bolts 58 passing through oppositely disposed buses 53 and 57 effecting electrical connection thereof and supporting them by strips 52.

Difficulty has been experienced in the past in attaching conductors to the electrodes of rectifier elements of the copper-copper oxide type. As the temperature at which the effectiveness of the oxide film is destroyed is comparatively low, low melting point solders having been utilized to make electrical connection to rectifier electrodes. Particularly in a system as previously described in which the inverse current is allowed to attain higher values than is common, the temperature of the rectifier is often sufficient to soften the solder resulting in a high resistance connection. The heat locally generated then melted the solder and opened the circuit. In the case of rectifier elements in parallel, the load on the remaining elements in circuit increased destroying them without further unsoldering of connections, or causing further temperature rise and consequent unsoldering of the connections. Mere mechanical connection as by clamping elements is not satisfactory from the standpoint of permanency or efficiency.

The bars 53 and 57 are attached to the respective rectifier plates or elements by connecting the bars, for example, to ground g, Fig. 1, and bringing the welding electrode W, preferably of bronze or copper after striking of an arc, adjacent the points of contact between the bars and the rectifier plates.

In the arrangement shown there are 8 rectifier discs in series in each arm of the bridge across 55 volts at no-load. The number of discs in series may be reduced to 6 for example, which is in excess of 9 volts per disc. The number actually used may vary depending upon the amount of inductive reactance placed in the circuit, all of which as X1 may be in an alternating path including the rectifier as claimed in my co-pending application Serial No. 290,668, filed July 5, 1928, of which this is in part a continuation, or all of which inductance as X may be in a uni-directional current path of the rectifier output circuit, or which may be distributed, some in the input circuit of the rectifier and the remainder in the output circuit thereof. A practical operating limit with the cupric oxide rectifier discs available is as high as 15 volts per disc when the inductance is of proper value.

The number of racks may as indicated correspond in number to the arms of the bridge, although of course they may be greater or smaller in number. The number of rectifier elements in parallel between adjacent buses 53, 53, for example, depends upon the anticipated load, or output for which the system is designed. With the apparatus shown in Figs. 2 to 4 capable of delivering in excess of 200 amperes in the arc circuit, with a maximum output of approximately 250 direct current amperes, the number of discs in parallel may be approximately 50, giving an approximate forward current per disc of the order of 2¼ amperes per disc having two square inches of active surface. The inverse current, when a cooling system as above specified is utilized giving 500 cubic feet of air per minute, will be approximately .2 amperes per disc R. M. S. value. For short intervals the inverse current may be permitted to go to higher values, for example, to .4 amperes per disc so that in general practice, the protective devices, as thermostat 26, may be adjusted to effect tripping of breaker 28 when the R. M. S. value is of .3 amperes or excess per disc.

The rectifier as a whole has a resistance of 5 ohms or more at 200 amperes which assists in stabilizing the arc. This stabilizing effect may be varied by cutting or or out of circuit, as by suitable switching mechanism, one or more discs in series.

Each rack is normally retained in position by bolts 59 which pass through each pair of guide rails 51 and an interposed strip 52. To remove a group of rectifiers, in this instance, in an arm of the bridge, it is only necessary to remove bolts 59 and slide out the entire group as a unit. The individual parallelly connected units may be then tested and replaced if necessary.

The racks are so positioned, that the edgewise surfaces of the individual rectifier elements are presented to the cooling air to obtain as large a radiating surface as possible with least obstruction to free passage of the air.

Heretofore all direct current arc-welding outfits operable from a source of alternating current comprised an alternating current motor directly coupled to a high current low potential direct current generator of special and complicated construction. The transformer-rectifier welder above described can be constructed at about one-half the initial cost of the motor-generator set type and has the advantage that it is a static device having no moving parts. The overall efficiency of the rectifier-transformer welder described is approximately 55% to 60% and the efficiency of motor generator sets is from 30% to 40%, the ratio of the two efficiencies clearly indicating the enormous savings in power effected by use of the transformer-rectifier combination.

In the modification of my invention shown in Fig. 8, from the primary P of the transformer T may extend conductors to two sets of contacts 14 and two switches 13, preferably mechanically connected for movement in unison by actuation of an operating handle 13', the linkage or equivalent, being desired to effect movement of the switch arms in opposite directions, when the contacts are disposed as shown.

Instead of utilizing rectifiers connected in a Wheatstone bridge arrangement to effect full wave rectification, the midpoint of the secondary S may be connected to ground, or to one electrode, and opposite terminals of the secondary S connected to like elements of the rectifiers 60 whose other elements or electrodes of opposite polarity are connected through the reactor X to the welding electrode W. In circuit between each terminal of the secondary S and the reactor X may be included additional inductance X1 to permit reduction of the number of rectifier elements connected in series, as described and claimed in my aforesaid application. It will be understood that inductances X1 may also be utilized in the bridge arms of the rectifying system shown in Fig. 1 as shown in Fig. 8a, either with or without inductance X in the load or output circuit of the rectifier and/or inductance X2 in the alternating current or input side of the rectifier.

In the modification of my invention shown in Fig. 9, in circuit between the terminals of the secondary S of the transformer and the points A and B of the rectifier bridge, are included switches 61 and 62 to permit disconnection of the rectifier bridge from the secondary S, the conductors 63 and 64, one of which includes suitable smoothing reactor X2, being connected to electrodes for cutting as distinguished from welding. It is not necessary to use direct current for satisfactory cutting, and the maximum alternating current output of the transformer T is substantially in excess of the sustained direct current output of the rectifier bridge. A plurality of thermostats, 26, connected in parallel and individually and respectively disposed adjacent different arms of the bridge, effect energization of the tripping coil 27 of the circuit breaker 28 upon excessive temperature of rectifiers in any arm of the bridge. Circuit elements similar to those previously described are identified by the same reference characters in both Figs. 8 and 9.

In Fig. 10 there is disclosed a polyphase system, specifically a three phase system, in which the delta-connected primary P is in three sections, P1, P2 and P3 each included in a phase. The secondary S comprises the star-connected windings S1, S2 and S3, the junction or common connection of each is connected to ground, preferably through the reactance X. The free terminals of each of the secondary windings S1, S2 and S3 are connected to like poles of rectifiers 60, as in Fig. 8, opposite poles of the rectifiers being connected to the electrode W. The number of rectifier elements connected in series, and in parallel depends upon, among other things, the difference in potential between free terminals of the secondaries, the load, etc. and the magnitude of inductance X.

Polyphase operation may also be effected by connecting the transformer primaries P of units such as shown in Fig. 1 to corresponding phases, and connecting in parallel the output circuits of the rectifiers in the secondary circuits of the transformers.

While the rectifier systems thus far described have all been connected with arc welding apparatus or equipment, many features of my invention are capable of being utilized to advantage in association with other and specifically different types of apparatus and for different purposes, for example, for electroplating, as chromium plating, etc. and other uses in which a counter-emf is encountered, as in battery-charging, D. C. motor operation, etc.

In Fig. 11 the windings 65 and 66 of a reciprocating electric hammer having a core Z are alternately energized by impulses of rectified alternating current supplied thereto respectively by the rectifiers 67 and 68, elements of opposite character of which are connected through the movable contact member of the circuit breaker 28 to line conductor 1, the common return circuit of the windings being completed to the other supply conductor 2. In the connection between winding 66 and rectifier 68 for example, there is included the resistance 30, in shunt to which is connected the rectifier element 31 and the movable coil 32 effective as above described upon flow of excessive inverse current through rectifier 68 to complete a circuit by engagement of contacts 38 and 39 through the tripping coil 27 of breaker 28. The magnetic field in which the coil 32 moves may be produced by a permanent magnet, or as above described by the winding 35 of an electro-magnet through which unidirectional current supplied by a rectifier bridge 36 flows.

In the arrangement previously described herein, the reactor X is in series with the arc or other translating device, or load whereas in the system of Fig. 12, it is in shunt thereto. In Fig. 12a, the reactance is capacitative and comprises a condenser K in shunt to the arc to suppress ripple. In Fig. 12b a more effective circuit for that purpose, the condenser K in shunt to the arc being of low reactance to the relatively high frequency arc ripple and the inductance X exhibiting high reactance at arc ripple frequencies. In any of these modifications, inductances X, and/or X2 may be used, or the split-secondary type of rectifier employed instead of the bridge type shown.

Referring to Fig. 13 there is included in the input circuit of the rectifier a contact or switch member 70 biased to open position by a spring 71 or equivalent. The contact member is moved to, and held in closed circuit position in engagement with a pair of fixed contacts by a solenoid or electro-magnet 72 included in series with the secondary s of a transformer t and a rectifier element 73 in circuit with the arc welding electrode W and ground G. The inductance X' is included in circuit when the fixed contacts are not engaged by the movable member 70, to prevent the no-load voltage across the rectifier input terminals AH and the flow of inverse current through the rectifier, under no-load condition from being excessively high.

To initiate operation of the welding apparatus, the welding electrode W is momentarily touched to the work or to ground whereupon the solenoid 72 is energized moving the contact 70 to closed circuit position, shunting the inductance X'. The auxiliary contact member 74 completes the "sealing in" circuit so that the solenoid 72 remains energized after the welding electrode is removed from the work or ground. The increased potential of the rectifier input and output by shunting of impedance X' facilitates striking of the arc. As soon as the heavy arc current flows, the potential of the secondary S of the supply transformer drops to a value sufficiently low to avoid excessive inverse current through the rectifier.

In the event that the welding arc is not struck within comparatively short time after actuation of switch contact 70 to closed circuit position, the increased temperature of the rectifier due to the abnormal inverse current effects movement of the thermostatic element 26a breaking the circuit of the holding coil 72, whereupon the contact member 70 under the influence of the biasing spring 71 moves to open circuit position introducing the reactance X' in circuit to reduce the input voltage of the rectifier, or to break its input circuit as shown in Fig. 14. The thermostat is also effective as in the preceding figures to protect the rectifier from excessive inverse current or temperature regardless of cause, for example, overload.

The arrangement shown in Fig. 14 is generally similar in operation and result to that shown in Fig. 13. In this modification, as in the preceding, the welding electrode is momentarily touched to earth or ground completing an auxiliary circuit including the actuating coil 72 of the switch member 70 controlling the impedance of the input circuit of the rectifier. As the switch member 70 is moved to closed circuit position by action of the solenoid 72 upon its core 75, the auxiliary switch member 76 is moved to open circuit position, breaking the circuit of coil 72. However, upon striking of the arc, current flows through at least a portion of the winding 72 holding the switch contact 70 in closed circuit position. In the event that the arc is not struck within a reasonably short time after completion of the input circuit of the rectifier, the switch contact 70 is moved to open circuit position by the biasing spring 71 opposed, however, by mechanism introducing a time element, for example, a dashpot 78 generally, or equivalent, as a time train, etc.

The modification of my invention shown in Fig. 15 is generally similar in result and operation to that of Figs. 13 and 14. Momentary contact of the electrode W to the work or ground completes the circuit of a coil 72 effecting movement of switch contact 70 to closed circuit position in which it is held by suitable latch 79. When for any reason the inverse current through the rectifier becomes unduly high, for example, if the arc is not struck within reasonable time after the aforesaid momentary contact of electrode W, if there is heavy overload, etc., the thermostatic element 26a responds to complete the circuit of a tripping coil 80 which moves the latch member 79 from its restraining position, permitting the contact member 70 to move to open circuit position under the influence of its biasing spring 71.

What I claim is:

1. The combination with a source of alternating current, and a rectifier in circuit therewith of the type permitting inverse current, of means responsive to the magnitude of the inverse current for controlling the impedance of said circuit.

2. The combination with a source of alternating current, and a rectifier in circuit therewith of the type permitting inverse current, of means responsive to the magnitude of the inverse current for interrupting said circuit.

3. The combination with a source of alternating current, and a rectifier of the copper-cuprous oxide type in circuit therewith, of means responsive to temperature of the rectifier controlling the impedance of said circuit.

4. The combination with a source of alternating current, and a rectifier in circuit therewith and of a type permitting substantial inverse current, of means responsive to the temperature of said rectifier as influenced by the magnitude of the inverse current for interrupting said circuit.

5. The combination with a main rectifier of a type permitting substantial flow of inverse current, of a system comprising an auxiliary rectifier in circuit with said main rectifier and reversely poled with respect thereto, and means responsive to the forward current of said auxiliary rectifier controlling the current through said main rectifier.

6. The combination with a main rectifier of a type permitting substantial flow of inverse current, of a system comprising a conductive impedance traversed by the forward and inverse current of said rectifier, an auxiliary rectifier in shunt to said impedance and reversely poled with respect to said main rectifier, and means responsive to the forward current of said auxiliary rectifier controlling flow of current through said main rectifier.

7. The combination with a main rectifier comprising oppositely poled sections connected in series between supply conductors and of a type permitting flow of inverse current, of an impedance in series with said rectifier sections, an auxiliary rectifier in shunt to said impedance, and means responsive to the forward current of said auxiliary rectifier controlling flow of current through said sections.

8. The combination with a source of alternating current, a rectifier of a type permitting flow of inverse current disposed in a path traversed by alternating current from said source, and a translating device utilizing uni-directional current supplied thereto by said rectifier, of means adjacent said translating device controlling the impedance of said alternating current path to control said inverse current through said rectifier.

9. The combination with a source of alternating current, a rectifier of a type permitting flow of inverse current disposed in a path traversed by alternating current from said source, arc-welding electrodes supplied with uni-directional current from said rectifier, and means to control the impedance of said alternating current path disposed adjacent said electrodes to control said inverse current through said rectifier.

10. The combination with a source of alternating current and a translating device, of a rectifier network comprising a plurality of rectifier elements of a type permitting flow of inverse current, and so poled that the current through the translating device is uni-directional, inductive reactance in said rectifier network traversed by inverse current, and inductive reactance in series between the rectifier and the translating device effective with said inductive reactance in said network to limit the magnitude of inverse current and permit use of a smaller number of said rectifier elements in series.

11. An arc-welding system comprising welding electrodes, a source of undulating, uni-directional current connected thereto, and means for varying the amplitude of the current undulations to control the penetrating power of the arc.

12. An arc-welding system comprising an alternating current source, a rectifier associated therewith, arc-welding electrodes in circuit with said rectifier traversed by undulating impulses of the rectified alternating current, and inductive reactance variable to effect the desired amplitude of current undulations and thereby control the penetrating power of the arc.

13. An arc-welding system comprising a low frequency alternating current source, a rectifier associated therewith, arc-welding electrodes in circuit with said rectifier traversed by undulating impulses of the rectified alternating current, and reactance in circuit with said electrodes to effect substantial difference between the maximum and minimum values of the low frequency current undulations and thereby control the penetrating power of the arc.

14. An arc-welding system comprising a source of alternating current, a transformer having a primary winding connected thereto, a rectifier of a type permitting flow of inverse current connected to the secondary of said transformer, and means responsive to the magnitude of the inverse current of said rectifier to control the impedance of the alternating current path including said primary winding.

15. An arc-welding system comprising a source of alternating current, a transformer, switching means connecting the primary of said transformer to said source, a rectifier of the type permitting flow of inverse current connected to the secondary of said transformer, means responsive to the magnitude of inverse current controlling actuation of said switching means, and welding electrodes included in the direct-current output circuit of said rectifier.

16. An arc-welding system comprising a source of alternating current, a rectifier of a type permitting flow of inverse current, means effecting flow of cooling medium to limit the magnitude of inverse current, and welding electrodes included in the direct-current output circuit of said rectifier, and means to effect simultaneous flow of current from said source to said rectifier and operation of said cooling means to limit the magnitude of inverse both under conditions of no-load and load in said rectifier output circuit.

17. The combination of a source of alternating current, a transformer having a primary winding connected to said source, a rectifier connected to said source, welding electrodes, and means selectively to connect said electrodes to the secondary of said transformer to obtain alternating current for cutting or to the output circuit of said rectifier to obtain uni-directional current of lower voltage for welding.

18. An arc-welding system comprising a source of alternating current, oppositely poled rectifiers connected in series and effectively connected to terminals of said source, welding electrodes, a connection from one electrode to a point between said rectifiers of one polarity, and a connection from the other of said electrodes to a point of opposite polarity, said rectifiers being of a type permitting flow of inverse current whereby there is always afforded a current path relieving the system of transients due to making and breaking of the arc.

19. An arc-welding system comprising a supply source, a rectifier associated therewith, arc-welding electrodes connected in the output circuit of said rectifier, means movable to vary the impedance of a path including said rectifier and said source, and means in circuit with said electrodes for controlling said movable means.

20. An arc-welding system comprising a supply source, a rectifier of the type permitting flow of inverse current associated therewith, arc-welding electrodes connected in the output circuit of said rectifier, means movable to vary the impedance of a path including said rectifier and said source, means in circuit with said electrodes for controlling said movable means, and means responsive to rectifier temperature also controlling said movable means.

21. A system including a full-wave rectifier comprising rectifier units of a type permitting flow of inverse current connected to form a bridge with a plurality of said units connected in series in arms of the bridge, a source of alternating current effectively connected to one pair of conjugate points of said bridge, a uni-directional current load circuit connected to the other pair of conjugate points of said bridge, and inductive reactance of substantial magnitude included in said bridge for permitting fewer number of serially-connected rectifier units in said bridge without flow of excessive inverse current.

22. A system including a full-wave rectifier comprising rectifier units of a type permitting flow of inverse current connected to form a bridge with a plurality of said units connected in series in arms of the bridge, a source of alternating current connected to one pair of conjugate points of said bridge, an impedance of substantial inductive reactance in circuit between said source and said bridge, a uni-directional load circuit connected to the other pair of conjugate points of said bridge, and impedance of substantial inductive reactance included in said bridge and effective with said first impedance for permitting fewer number of serially connected rectifier units in said bridge without flow of excessive inverse current.

23. A system including a full-wave rectifier comprising rectifier units of a type permitting flow of inverse current connected to form a bridge with a plurality of said units connected in series in arms of the bridge, a source of alternating current connected to one pair of conjugate points of said bridge, an impedance of substantial inductive reactance in circuit between said source and said bridge, a uni-direction current load circuit connected to the other pair of conjugate points of said bridge, and inductive reactance of substantial magnitude included in said load circuit and effective with said impedance for permitting fewer number of serially connected rectifier units in said bridge without flow of excessive inverse current.

24. An arc-welding system comprising a source of alternating current, a rectifier of the type permitting flow of inverse current, welding electrodes in the load system of said rectifier, a switch between said rectifier and said source, electro-magnetic operating means therefor energized upon momentary contact of said electrodes to close said switch, and means responsive to prolonged non-existence of an arc between said electrodes to effect opening of said switch to protect said rectifier from flow of excessive inverse current due to high no-load voltage.

25. An arc-welding system comprising a source of alternating current, a rectifier of the type permitting flow of inverse current, welding electrodes in the load system of said rectifier, a switch between said rectifier and said source, electro-magnetic operating means therefor energized upon momentary contact of said electrodes to close said switch, and means responsive to excessive inverse current for opening said switch.

26. An arc-welding system comprising a source of alternating current, a rectifier of the type permitting flow of inverse current, welding electrodes in the load system of said rectifier, a switch between said rectifier and said source, a closing coil therefor energized upon momentary contact of said electrodes and de-energized by closing of said switch, a holding coil for said switch in circuit with said electrodes, and means effective upon prolonged non-existence of an arc with de-energization of said holding coil for opening said switch to protect said rectifier from flow of inverse current due to high no-load voltage.

27. An arc-welding system comprising a source of alternating current, a rectifier of the type permitting flow of inverse current, welding electrodes in the load system of said rectifier, a switch between said rectifier and said source having operating means energized upon momentary contact of said electrodes to close said switch, and means for protecting said rectifier from excessive inverse current due to high no-load voltage comprising means responsive to non-existence of the arc for effecting opening of said switch.

28. An arc welding system comprising a source of alternating current, a rectifier of the type permitting flow of inverse current, welding electrodes in the load system of said rectifier, a switch between said rectifier and said source having operating means energized upon momentary contact of said electrodes to close said switch, and means for protecting said rectifier from excessive inverse current due to high no-load voltage comprising means responsive to interruption of the arc for effecting opening of said switch.

29. A system comprising a source of alternating current, a rectifier of the type permitting flow of inverse current, a uni-directional current load circuit for said rectifier, and means for protecting said rectifier from excessive inverse current due to high no-load voltage comprising a circuit controlling means between said rectifier and said source and having operating means responsive to interruption of said load circuit.

30. A system comprising a source of alternating current, a rectifier comprising rectifier units of a type permitting flow of inverse current and connected so that inverse current flows both under conditions of no-load and load in the rectifier output circuit, means including means for effecting flow of a cooling medium into heat-transfer relation with said units for permitting fewer number of serially connected rectifier units without flow of excessive inverse current, and means effecting operation of said cooling means concurrently with connection of the rectifier to said source of alternating current to limit the inverse current to safe magnitude notwithstanding the fewer number of serially connected rectifier units and under conditions of no-load and load in the rectifier output circuit.

31. A system comprising a source of alternating current, a rectifier of a type permitting flow of inverse current and connected so that inverse current flows both for conditions of no-load and load in the rectifier output circuit, means effecting flow of a cooling medium into heat transfer relation with said rectifier, and means effecting operation of said cooling means concurrently with connection of the input circuit of the rectifier to said source of alternating current to protect the rectifier from flow of excessive inverse current under conditions of no-load and load in the rectifier output circuit.

32. The combination with a source of alternating current, of a rectifying system having input and output terminals, said input terminals connected to said source of alternating current, a load circuit connected to said output terminals and traversed by the rectified current, imperfect rectifier units included in said system connected between said input terminals thereby subjecting said units to the alternating voltage of said source continuously during presence and absence of rectified current in and from said load circuit, and means for forcibly cooling said imperfect rectifier units to reduce inverse current therethrough during absence of rectified current from said load circuit.

CARL S. WEYANDT.